United States Patent
Bisson et al.

(10) Patent No.: US 12,448,314 B2
(45) Date of Patent: Oct. 21, 2025

(54) METHODS OF MANUFACTURING GLASS RIBBON

(71) Applicant: Corning Incorporated, Corning, NY (US)

(72) Inventors: Antoine Gaston Denis Bisson, Bois le Roi (FR); Daniel Rousseau, Noisy sur Ecole (FR)

(73) Assignee: CORNING INCORPORATED, Corning, NY (US)

( * ) Notice: Subject to any disclaimer, the term of this patent is extended or adjusted under 35 U.S.C. 154(b) by 709 days.

(21) Appl. No.: 16/760,746

(22) PCT Filed: Oct. 30, 2018

(86) PCT No.: PCT/US2018/058122
§ 371 (c)(1),
(2) Date: Apr. 30, 2020

(87) PCT Pub. No.: WO2019/089525
PCT Pub. Date: May 9, 2019

(65) Prior Publication Data
US 2020/0290915 A1     Sep. 17, 2020

Related U.S. Application Data

(60) Provisional application No. 62/579,556, filed on Oct. 31, 2017.

(51) Int. Cl.
*C03B 17/06*     (2006.01)

(52) U.S. Cl.
CPC .................................. *C03B 17/068* (2013.01)

(58) Field of Classification Search
CPC ....... C03B 17/061; C03B 18/06; C03B 13/04; C03B 13/16
See application file for complete search history.

(56) References Cited

U.S. PATENT DOCUMENTS

| | | | | |
|---|---|---|---|---|
| 1,593,567 A | * | 7/1926 | Byrnes | C03B 35/184 65/374.11 |
| 3,137,556 A | * | 6/1964 | Badger | C03B 15/18 65/196 |

(Continued)

FOREIGN PATENT DOCUMENTS

| | | | | |
|---|---|---|---|---|
| CN | 102471119 B | * | 6/2014 | ........... C03B 17/061 |
| CN | 203805055 U | * | 9/2014 | |

(Continued)

OTHER PUBLICATIONS

Translation of Kojima et al. (JP 2011057522) as provided by PE2E search (Year: 2011).*

(Continued)

*Primary Examiner* — Jodi C Franklin
(74) *Attorney, Agent, or Firm* — Matthew J. Mason

(57) ABSTRACT

A method of manufacturing glass ribbon can comprise feeding molten material through a minimum width of a first gap defined between a first roller and a second roller of a first pair of rollers. A first pool of molten material can be formed upstream from the minimum width of the first gap. A ribbon of molten material can exit the first gap. The methods can further include passing the ribbon of molten material through a minimum width of a second gap defined between a first roller and a second roller of a second pair of rollers. The minimum width of the first gap can be greater than the minimum width of the second gap. A second pool of molten material can be formed upstream from the minimum width of the second gap.

19 Claims, 4 Drawing Sheets

(56) References Cited

U.S. PATENT DOCUMENTS

| | | | | |
|---|---|---|---|---|
| 3,961,927 | A * | 6/1976 | Alderson | C03B 13/04 65/84 |
| 5,885,315 | A | 3/1999 | Fredholm et al. | |
| 5,970,747 | A * | 10/1999 | Fredholm | C03B 13/12 65/254 |
| 6,101,845 | A * | 8/2000 | Kojima | C03B 17/061 65/25.2 |
| 7,913,517 | B2 * | 3/2011 | Shiraishi | C03B 13/04 65/25.2 |
| 7,934,392 | B2 * | 5/2011 | Greulich-Hickmann | C03B 13/04 65/25.2 |
| 8,359,887 | B2 * | 1/2013 | Bisson | C03B 17/068 65/254 |
| 8,713,972 | B2 | 5/2014 | Lakota et al. | |
| 9,643,872 | B2 * | 5/2017 | Fredholm | C03B 13/16 |
| 10,246,365 | B2 | 4/2019 | Bisson et al. | |
| 2003/0037573 | A1 * | 2/2003 | Langsdorf | C03B 35/184 65/158 |
| 2004/0093900 | A1 * | 5/2004 | Fredholm | C03B 17/064 65/44 |
| 2005/0103054 | A1 * | 5/2005 | Shiraishi | C03B 17/068 65/99.2 |
| 2006/0010915 | A1 | 1/2006 | Greulich-Hickmann et al. | |
| 2009/0205373 | A1 * | 8/2009 | Kojima | C03B 13/16 65/253 |
| 2012/0159989 | A1 * | 6/2012 | Shiraishi | C03B 17/061 65/169 |
| 2012/0304695 | A1 * | 12/2012 | Lakota | C03B 17/064 65/97 |
| 2013/0133369 | A1 * | 5/2013 | Lock | C03B 17/065 65/93 |
| 2013/0319049 | A1 * | 12/2013 | Grzesik | C03B 17/064 65/195 |
| 2014/0144181 | A1 * | 5/2014 | Poissy | C03B 13/04 65/253 |
| 2014/0283554 | A1 * | 9/2014 | Fredholm | C03B 17/068 65/90 |
| 2014/0318184 | A1 * | 10/2014 | Likitvanichkul | C03C 19/00 65/33.1 |
| 2017/0183255 | A1 * | 6/2017 | Walther | C03C 3/091 |
| 2017/0210095 | A1 * | 7/2017 | Ouderkirk | B32B 37/15 |
| 2019/0202729 | A1 * | 7/2019 | Champion | A61K 39/39 |
| 2020/0339464 | A1 * | 10/2020 | Tamamura | C03B 25/00 |

FOREIGN PATENT DOCUMENTS

| | | | | |
|---|---|---|---|---|
| CN | 105189378 | A | | 12/2015 |
| CN | 107176787 | A * | 9/2017 | C03B 35/166 |
| CN | 104024929 | B * | 10/2017 | C03B 17/065 |
| CN | 108137367 | A | | 6/2018 |
| CN | 111018320 | A * | 4/2020 | C03B 17/064 |
| EP | 2258664 | A1 | | 12/2010 |
| JP | 2001180949 | A * | 7/2001 | C03B 13/04 |
| JP | 2010-235354 | A | | 10/2010 |
| JP | 2011057522 | A * | 3/2011 | C03B 13/04 |
| JP | 2014-520059 | A | | 8/2014 |
| JP | 2016-522145 | A | | 7/2016 |
| TW | 201628982 | A * | 8/2016 | C03B 17/06 |
| WO | 2015/054329 | A1 | | 4/2015 |

OTHER PUBLICATIONS

International Search Report and Written Opinion of The International Searching Authority; PCT/US2018/058122; Mailed Jan. 25, 2019; 13 Pages; European Patent Office.

Chinese Patent Application No. 201880081383.6, Office Action dated Feb. 23, 2022, 11 pages (4 pages of English Translation and 7 pages of Original Document), Chinese Patent Office.

Japanese Patent Application No. 2020-543264, Office Action, dated Jul. 27, 2022, 12 pages (6 pages of English Translation and 6 pages of Original Copy); Japanese Patent Office.

Yamane, Masayuki, "Chapter 3: Thermal Processing," Glass Engineering Handbook, Asakura Publishing Co. Ltd., Jul. 1999, pp. 410-417.

* cited by examiner

METHODS OF MANUFACTURING GLASS RIBBON

CROSS-REFERENCE TO RELATED APPLICATIONS

This application claims the benefit of priority under 35 U.S.C. § 371 of International Application Serial No. PCT/US2018/058122, filed Oct. 30, 2018, which claims the benefit of priority under 35 U.S.C. § 119 of U.S. Provisional Application Ser. No. 62/579,556, filed on Oct. 31, 2017, the contents of both of which are relied upon and incorporated herein by reference in their entirety.

FIELD

The present disclosure relates generally to methods of manufacturing glass ribbon and, more particularly, to methods of manufacturing glass ribbon with a first pair of rollers and a second pair of rollers.

BACKGROUND

It is known produce glass ribbon with a precision glass roll forming apparatus. It is known to provide a pair of forming rolls vertically below a glass feed to thin the supplied stream of molten glass to produce a formed glass ribbon. It is further known to place another pair of sizing rolls vertically below the forming rolls.

SUMMARY

The following presents a simplified summary of the disclosure to provide a basic understanding of some embodiments described in the detailed description.

In some embodiments, a method of manufacturing glass ribbon can comprise feeding molten material through a minimum width of a first gap defined between a first roller and a second roller of a first pair of rollers. A first pool of molten material can be formed upstream from the minimum width of the first gap. The viscosity of the molten material within the first pool of molten material can be from about 5 Poises to about 5,000 Poises. A ribbon of molten material can exit the first gap. The methods can further include passing the ribbon of molten material through a minimum width of a second gap defined between a first roller and a second roller of a second pair of rollers. The minimum width of the first gap can be greater than the minimum width of the second gap. A second pool of molten material can be formed upstream from the minimum width of the second gap and the viscosity of the molten material within the second pool of molten material can be from about 10,000 Poises to about 100,000 Poises.

In some embodiments, a method of manufacturing glass ribbon can comprise feeding molten material through a minimum width of a first gap defined between a first roller and a second roller of a first pair of rollers while adjusting the minimum width of the first gap. A first pool of molten material may be formed upstream from the minimum width of the first gap. A ribbon of molten material can exit the first gap. The method can include passing the ribbon of molten material through a minimum width of a second gap defined between a first roller and a second roller of a second pair of rollers. The minimum width of the first gap can be greater than the minimum width of the second gap. A second pool of molten material can be formed upstream from the minimum width of the second gap.

In some embodiments, a method of manufacturing glass ribbon can comprise feeding molten material through a minimum width of a first gap defined between a first roller and a second roller of a first pair of rollers without contacting at least the first roller of the first pair of rollers. A first pool of molten material can be formed upstream from the minimum width of the first gap. A ribbon of molten material can exit the first gap. The methods can further include passing the ribbon of molten material through a minimum width of a second gap defined between a second pair of rollers. The minimum width of the first gap can be greater than the minimum width of the second gap. A second pool of molten material may formed upstream from the minimum width of the second gap.

In some embodiments, the second pair of rollers can impart at least one major surface of the ribbon of molten material passing through the second gap with a surface roughness of from 0.5 microns to 100 microns.

In some embodiments, the minimum width of the first gap can be from 1 mm to 5 mm.

In some embodiments, the minimum width of the second gap can be from 0.5 mm to 2.5 mm.

In some embodiments, the ribbon of molten material may not contact at least the first roller of the first pair of rollers when passing through the first gap.

In some embodiments, a first fluid cushion can be positioned between the first roller of the first pair of rollers and a first major surface of the ribbon of molten material passing through the first gap.

In some embodiments, the ribbon of molten material may not contact the second roller of the first pair of rollers when passing through the first gap.

In some embodiments, a second fluid cushion can be positioned between the second roller of the first pair of rollers and a second major surface of the ribbon of molten material passing through the first gap.

In some embodiments, the methods may further comprise adjusting the minimum width of the first gap while passing the ribbon of molten material through the minimum width of the first gap.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
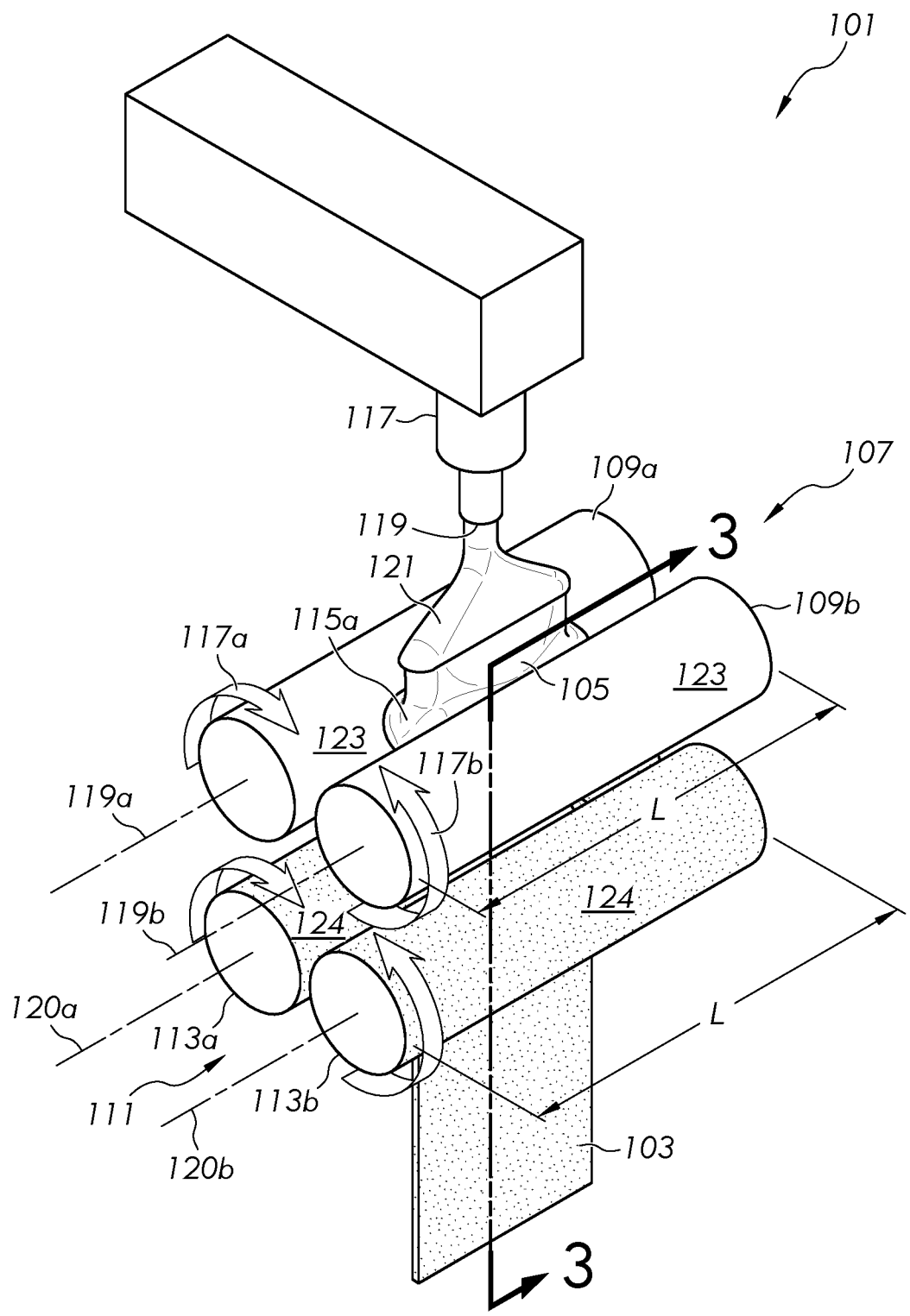
FIG. 1 illustrates a perspective view of a glass manufacturing apparatus producing glass ribbon from molten material.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Figure 2:
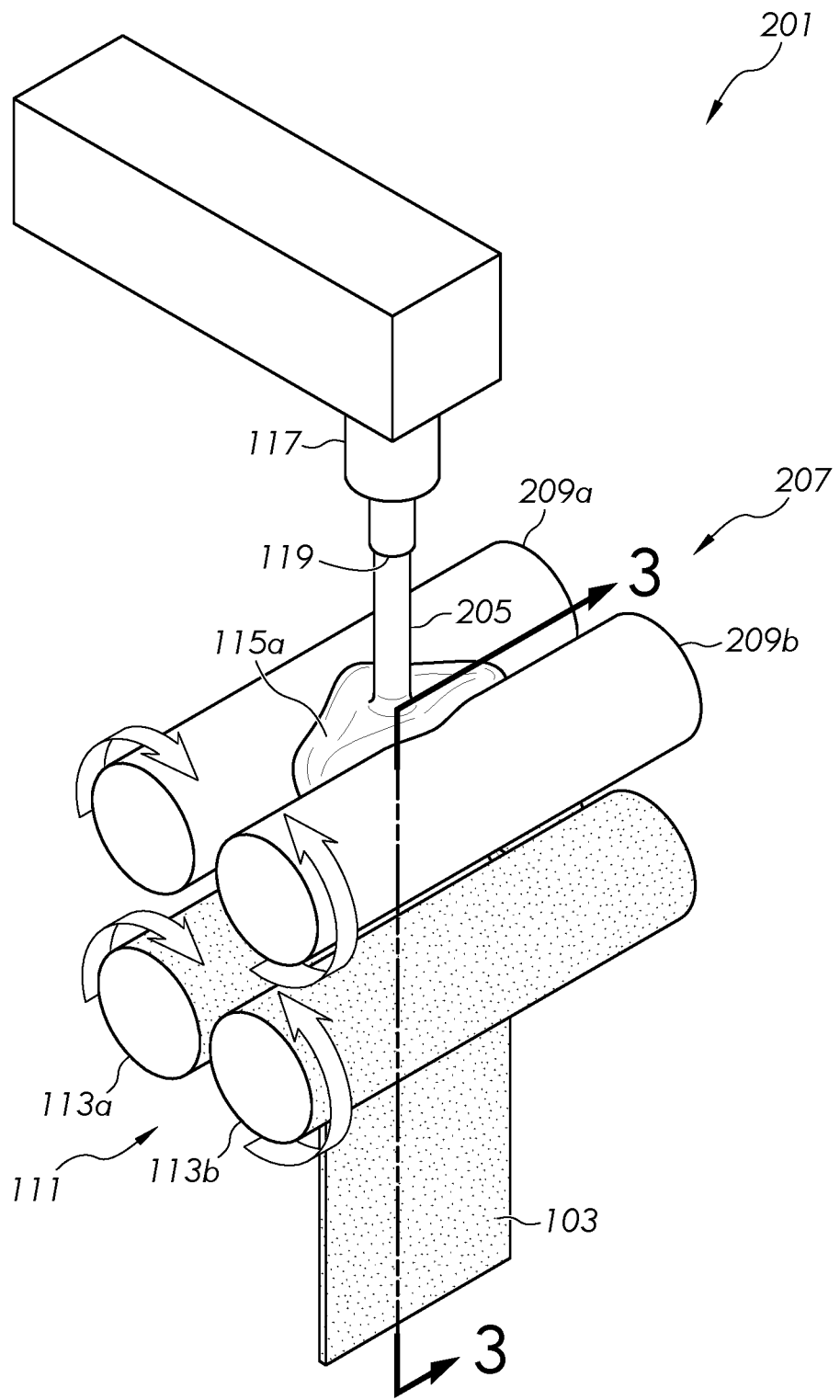
FIG. 2 illustrates a perspective view of another glass manufacturing apparatus producing glass ribbon from molten material.

FIGS. 1 and 2 each illustrate alternative embodiments of a glass manufacturing apparatus 101, 201 for manufacturing a glass ribbon 103. The glass manufacturing apparatus 101, 201 can include a molten material delivery conduit 117 that can include an outlet port 119 to dispense molten material 105, 205 to a first pair of rollers 107, 207. In some embodiments, as shown in FIG. 1, the outlet port 119 can include a flared end portion 121 to cause the stream of molten material 105 flow downwardly in an elongated stream of molten material. Alternatively, as shown in FIG. 2, the outlet port 119 may deliver a circular cylindrical stream of molten material 205 although an elliptical cylindrical or other shaped stream of molten material may also be provided.

Unless otherwise noted, the first pair of rollers 107 can be identical structurally and/or functionally to the second pair of rollers 207. As such, unless otherwise noted, discussion of features and/or functionality of one of the pairs of rollers 107, 207 can apply to the other of the pairs of rollers 107, 207. As shown in FIG. 1, the first pair of rollers 107 can include a first roller 109a and a second roller 109b. In some embodiments, each roller 109a, 109b can comprise a circular cylindrical roller and can include identical outer diameters. Furthermore, as shown, in some embodiments, each roller 109a, 109b can be identical to one another.

Figure 3:
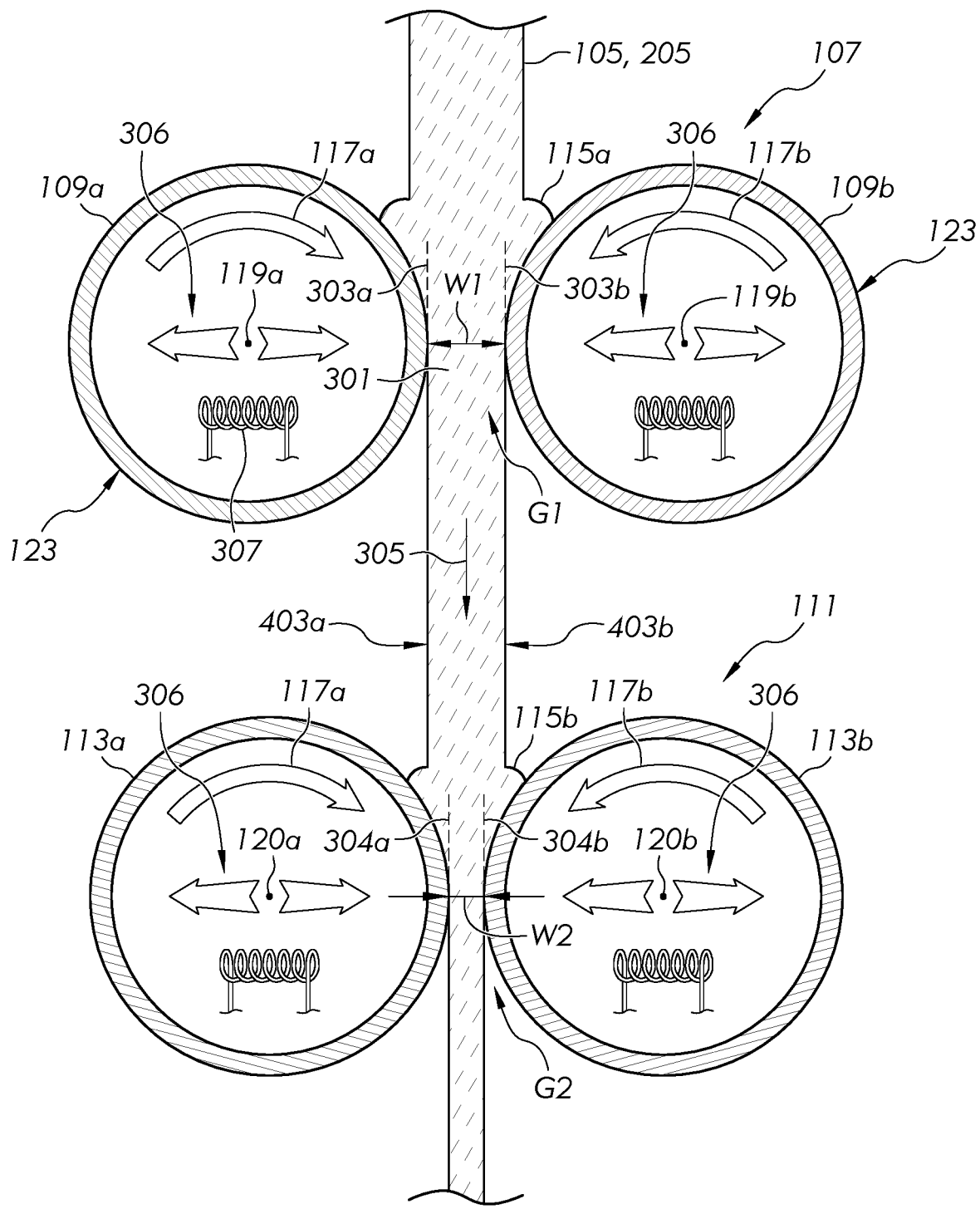
FIG. 3 illustrates a sectional view of a first embodiment of the glass manufacturing apparatus of FIG. 1 along line 3-3 of FIG. 1 and a first embodiment of the glass manufacturing apparatus of FIG. 2 along line 3-3 of FIG. 2.

In some embodiments, one or more motors (not shown) may rotate the rollers 109a, 109b in opposite rotation directions 117a, 117b about corresponding rotation axes 119a, 119b. For instance, as shown in FIG. 3, in one embodiment, the first roller 109a of the first pair of rollers 107 can be a rear side roller that rotates in a clockwise rotation direction 117a about a first rotation axis 119a. As further shown in FIG. 3, the second roller 109b of the first pair of rollers 107 can be a front side roller that rotates in a counterclockwise rotation direction 117b about a second rotation axis 119b.

As shown in FIG. 3, a first gap G1 can be defined between the first roller 109a and the second roller 109b of the first pair of rollers 107. A minimum width "W1" of the first gap "G1" can be defined between the points of each roller 109a, 109b that are closest to one another. As shown in FIG. 3, in some embodiments, the planes 303a, 303b of tangency at the closest points may be parallel to one another such that the minimum width "W1" is the same across the entire length "L" (see FIG. 1) of the pair of rollers 109a, 109b. In such embodiments, the resulting ribbon 301 of molten material may have a substantially constant thickness across the width of the resulting ribbon 301. Although not shown, in some embodiments, the minimum width may not occur across the entire length "L". For instance, the minimum width may be located at outer end portions of the rollers such that the resulting ribbon 301 of molten material may have a relatively thick central portion that tapers to each end edge of the ribbon 301 in the direction of the width of the ribbon 301 of molten material.

Furthermore, the planes 303a, 303b of tangency may extend in the draw direction 305 of the ribbon 301 of molten material that, in some embodiments, may be the direction of gravity. Furthermore, as shown, the velocity of points of tangency of each roller 109a, 109b, due to rotation of the rollers in rotational directions 117a, 117b, may be identical to one another and extend in the draw direction 305 (e.g., the direction of gravity).

In some embodiments, the minimum width "W1" of the first gap "G1" is from about 1 millimeter (mm) to about 5 mm. In further embodiments, the minimum width "W1" of the first gap "G1" is from about 2 mm to about 4 mm. In still further embodiments, the minimum width "W1" of the first gap "G1" is from about 2 mm to about 3 mm although other minimum widths may be provided in further embodiments. Moreover, one or both of the rollers 109a, 109b of the first pair of rollers 107 may be adjustable to adjust the minimum width "W1". For instance, FIG. 3 illustrates that each roller 109a, 109b may be adjusted along an adjustment direction arrows indicated at reference number 306. In some embodiments, the adjustment direction may be in the direction of the minimum width "W1" and/or in a direction perpendicular to the draw direction 305 (e.g., perpendicular to gravity). In some embodiments, adjustment of the first gap "G1" can provide an adjusted minimum width "W1" of from 1 mm to 5 mm, from 2 mm to 4 mm, or from 2 mm to 3 mm although other adjusted minimum widths may be provided in further embodiments.

As shown in FIG. 3, any of the rollers of the disclosure can include an optional cooling coil 307 to allow adjustment of cooling of the molten material passing through the gaps of the pairs of rollers. As such, the temperature of the molten material can be adjusted to provide desirable attributes to the glass ribbon 103.

Figure 4:
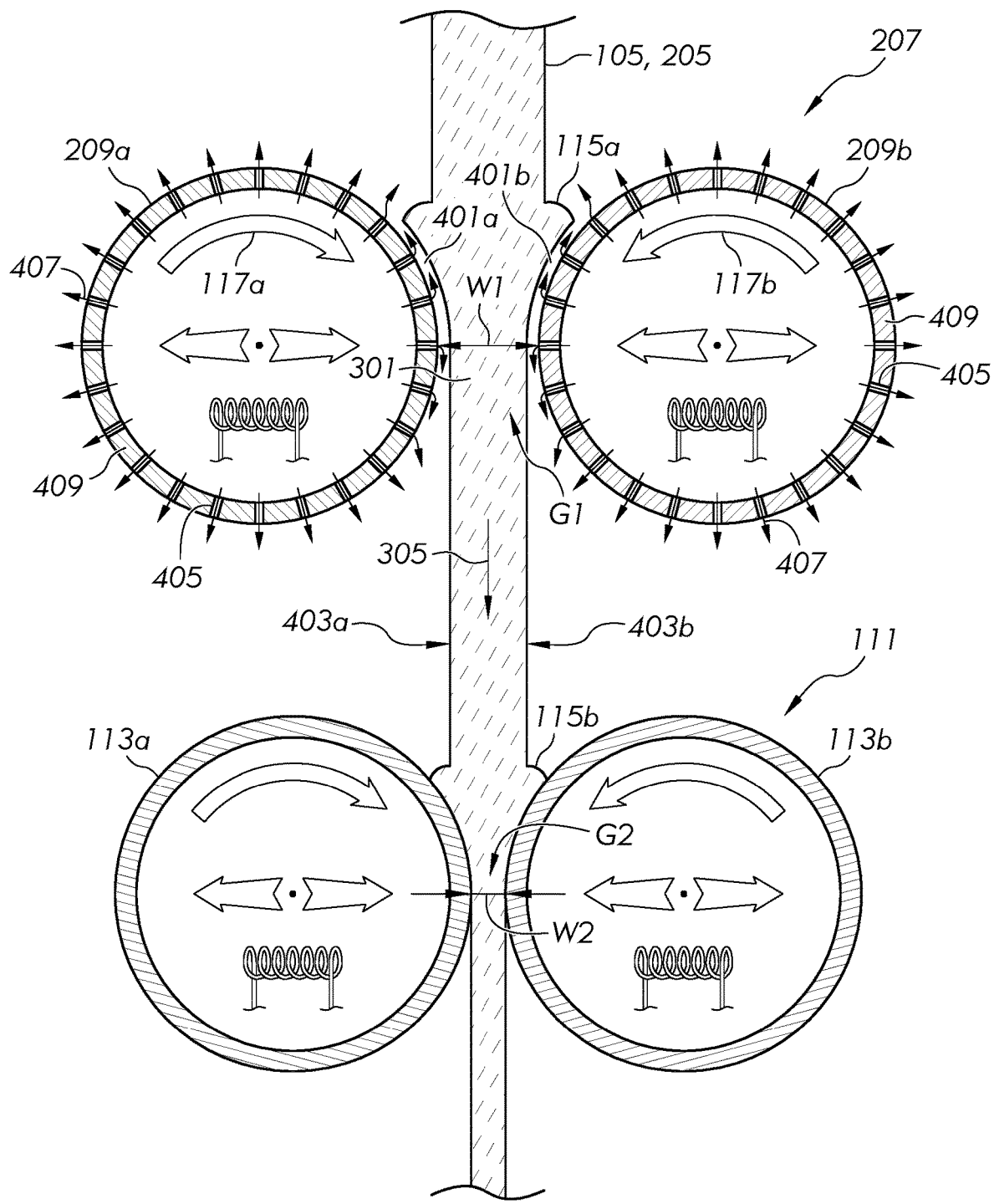
FIG. 4 illustrates a sectional view of a second embodiment of the glass manufacturing apparatus of FIG. 1 along line 3-3 of FIG. 1 and a second embodiment of the glass manufacturing apparatus of FIG. 2 along line 3-3 of FIG. 2.

As shown in FIGS. 1 and 3, in some embodiments, each roller 109a, 109b of the first pair of rollers 107 may include a smooth outer surface 123 and/or comprise an outer surface 123 that is impermeable to fluid. In alternative embodiments, the outer surface may comprise a patterned or other non-smooth surface. Furthermore, some embodiments may provide an outer surface that is permeable to fluid. For instance, as shown in FIG. 4, each roller 209a, 209b can include passages 405 to allow passage of fluid such as gas (e.g., air, nitrogen, inert gas) as indicted by exiting fluid streams 407. As shown, the passages 405 can comprise linear radial apertures extending through an outer wall 409 of the rollers 209a, 209b. The linear radial apertures of the first roller 209a can comprise a first plurality of linear radial apertures, and the linear radial apertures of the second roller 209b can comprise a second plurality of linear radial apertures. Also, each linear radial aperture of the first and second pluralities of linear radial apertures can comprise an unobstructed view of the molten material passing through the first gap "G1". In further embodiments, the passages may comprise paths between a porous wall (e.g., resulting from sintering to produce the roller).

The glass manufacturing apparatus can also include a second pair of rollers 111. Unless otherwise noted, the first pair of rollers 107, 207 can be identical structurally and/or functionally to the second pair of rollers 111. As such, unless otherwise noted, discussion of features and/or functionality of one of the pairs of first rollers 107, 207 and the second pair of rollers 111 can apply to the other of the pairs of rollers 107, 207 and the second pair of rollers 111. As shown in FIG. 1, the second pair of rollers 111 can include a first roller 113a and a second roller 113b. In some embodiments, each roller 113a, 113b can comprise a circular cylindrical roller and can include identical outer diameters. Furthermore, as shown, in some embodiments, each roller 113a, 113b can be identical to one another.

As shown in FIG. 1, in some embodiments, each roller 113a, 113b of the second pair of rollers 111 may include a textured outer surface 124 although only one of the rollers 113a, 113b may be provided with the textured outer surface 124 in further embodiments. Still further, although not shown, the outer surface may optionally comprise a smooth surface. Providing a textured outer surface 124 can allow the second pair of rollers 111 to imprint at least one major surface 403a, 403b of the ribbon 301 of molten material passing through a second gap "G2" with a surface roughness of from 0.5 microns to 100 microns.

In some embodiments, as shown in FIG. 3, one or more motors (not shown) may rotate the rollers 113a, 113b in opposite rotation directions 117a, 117b about corresponding rotation axes 120a, 120b. For instance, as shown in FIG. 3, in one embodiment, the first roller 113a of the second pair of rollers 111 can be a rear side roller that rotates in a clockwise rotation direction 117a about a first rotation axis 120a. As further shown in FIG. 3, the second roller 113b of the second pair of rollers 111 can be a front side roller that rotates in a counterclockwise rotation direction 117b about a second rotation axis 120b.

As shown in FIG. 3, a second gap G2 can be defined between the first roller 113a and the second roller 113b of the second pair of rollers 111. A minimum width "W2" of the second gap "G2" can be defined between the points of each roller 113a, 113b that are closest to one another. As shown in FIG. 3, in some embodiments, the planes 304a, 304b of tangency at the closest points may be parallel to one another such that the minimum width "W2" is the same across the entire length "L" (see FIG. 1) of the rollers 113a, 113b. In such embodiments, the resulting ribbon 301 of molten material may have a substantially constant thickness across the width of the resulting glass ribbon 103. Although not shown, in some embodiments, the minimum width may not occur across the entire length "L". For instance, the minimum width may be located at outer end portions of the rollers such that the resulting glass ribbon 103 may have a relatively thick central portion that tapers to each end edge of the glass ribbon 103 in the direction of the width of the glass ribbon 103.

Furthermore, the planes 304a, 304b of tangency may extend in the draw direction 305 of the ribbon 301 of molten material that, in some embodiments, may be the direction of gravity. Furthermore, as shown, the velocity of points of tangency of each roller 113a, 113b, due to rotation of the rollers in rotational directions 117a, 117b, may be identical to one another and extend in the draw direction 305 (e.g., the direction of gravity).

In some embodiments, the minimum width "W1" of the first gap "G1" can be greater than the minimum width "W2" of the second gap "G2". In some embodiments, minimum width "W2" of the second gap "G2" can be from 0.5 mm to 2.5 mm, or from 0.5 mm to 2 mm, or from 0.5 mm to 1 mm although other minimum widths may be provided in further embodiments. Moreover, one or both of the rollers 113a, 113b of the second pair of rollers 111 may be adjustable to adjust the minimum width "W2". For instance, FIG. 3 illustrates that each roller 113a, 113b may be adjusted along an adjustment direction arrows indicated at reference number 306. In some embodiments, the adjustment direction may be in the direction of the minimum width "W2" and/or in a direction perpendicular to the draw direction 305 (e.g., perpendicular to gravity). In some embodiments, adjustment of the second gap "G2" can provide an adjusted minimum width "W2" of from 0.5 mm to 2.5 mm. In further embodiments, adjustment of the second gap "G2" can provide an adjusted minimum width "W2" of from 0.5 mm to 2 mm. In still further embodiments, adjustment of the second gap "G2" can provide an adjusted minimum width "W2" of from 0.5 mm to 1 mm.

Example methods of manufacturing glass ribbon 103 can feed molten material molten material 105, 205 through a minimum width "W1" of a first gap "G1" defined between the first roller 109a, 209a and the second roller 109b, 209b of the first pair of rollers 107, 207. As shown in FIG. 1, some embodiments may flare the molten material outwardly (e.g., with flared end portion 121) such that the molten material 105 is elongated in the direction of the length of the first gap "G1". Flaring the molten material outwardly can facilitate initial placement and subsequent flow of the molten material along the upper portion of the first gap "G1" before reaching the minimum width "W1" of the first gap "G1". Alternatively, as shown in FIG. 2, some embodiments may allow a flow of molten material to be introduced into the upper portion of the first gap "G1" with a nonflared flow of molten material 205. For instance, the molten material may simply flow from the outlet port 119 (e.g., circular outlet port) to be introduced into the upper portion of the first gap "G1". In such embodiments, the molten material may still have time to quickly flow along a length of the first gap "G1" before reaching the minimum width "W1" of the first gap "G1" due to the relatively low viscosity of the molten material 205.

In some embodiments, the methods may include adjusting the minimum "W1" width of the first gap "G1" while passing a ribbon 301 of molten material through the minimum width "W1" of the first gap "G1". For example, actuators (not shown) may increase or decrease the minimum width "W1" of the first gap "G1" by moving one or both of the first roller 109a and second roller 109b of the first pair of rollers 107 in alternative directions as shown by reference number 306. Adjustment of the minimum width "W1" of the first gap "G1" can control the flow of material through the first gap "G1" to be received by the second gap "G2" of the second pair of rollers 111.

The flow of material 105, 205 flows at a rate fast enough that a first pool 115a of molten material is formed upstream from the minimum width "W1" of the first gap "G1". In some embodiments the first pool 115a of molten material can quickly spread along a length of the first gap "G1" due to the relatively low viscosity of the molten material within the first pool 115a. In some embodiments, the viscosity of the molten material within the first pool 115a can be from about 5 Poises to about 5,000 Poises. In another embodiment, the first pool 115a can have a viscosity of from about 500 Poises to about 2,000 Poises to allow quick spreading of the molten material along a length of the first gap "G1".

For purposes of this application, "pool of molten material" is considered a reservoir of accumulated molten material positioned upstream from the minimum width of the corresponding gap between the pair of rollers that can exist at a steady state where the mass flow rate of the molten material entering the first gap equals the mass flow rate of the molten material of the ribbon exiting the gap. The reservoir of accumulated molten material permits consistent continuous feeding of molten material to the minimum width of the gap even during an interruption or other inconsistency in the mass flow rate of the material being fed to the gap. For example, a momentary abrupt reduction in the mass flow rate of the material being fed to the gap may be compensated by the pool of molten material as accumulated molten material within the pool of molten material may be used to counter the short abrupt reduction in the mass flow rate of molten material being fed to the gap; thereby maintaining thickness uniformity in the ribbon exiting the gap. During such an event, the mass of molten material within the pool of molten material may be reduced. Nonetheless, the depleted molten material within the pool of molten material may be replenished once the flow rate returns to normal and steady state is again achieved.

As such, the first pool of material 115a can comprise a reservoir of accumulated molten material positioned upstream from the minimum width "W1" of the first gap "G1" between the first pair of rollers 107, 207 that can exist at a steady state where the mass flow rate of the molten material 105, 205 entering the first gap "G1" equals the mass flow rate of molten material of the ribbon 301 exiting the first gap "G1".

As shown in FIG. 4, in some embodiments, the first pool of material 115a and/or the ribbon 301 of molten material does not contact at least the first roller 209a of the first pair of rollers 207 when passing through the first gap "G1". For instance, as shown, a first fluid cushion 401a may be positioned between the first roller 209a of the first pair of rollers 207 and a first major surface 403a of the ribbon 301 of molten material passing through the first gap "G1". Furthermore, as shown the first fluid cushion 401a may also be positioned between the first roller 209a of the first pair of rollers 207 and the first pool of material 115a.

As further shown in FIG. 4, in some embodiments, the first pool of material 115a and/or the ribbon 301 of molten material does not contact the second roller 209b of the first pair of rollers 207 when passing through the first gap "G1". For instance, as shown, a second fluid cushion 401b may be positioned between the second roller 209b of the first pair of rollers 207 and a second major surface 403b of the ribbon 301 of molten material passing through the first gap "G1". Furthermore, as shown the second fluid cushion 401b may also be positioned between the second roller 209b of the first pair of rollers 207 and the first pool of material 115a.

The fluid cushions 401a, 401b can be produced in some embodiments with pressurized fluid within the hollow interior being emitted through the outer wall 409 such that the molten material is pushed away from contacting the first pair of rollers 207. The first fluid cushion 401a can be produced by passing a fluid stream through each linear radial aperture of the first plurality of linear radial apertures, and the second fluid cushion 401b can be produced by passing a fluid stream through each linear radial aperture of the second plurality of linear radial apertures. Preventing contact between the molten material and the rollers 207 can help reduce loss of heat to the rollers as the molten material passes through the first gap "G1" since the fluid cushion does not transfer heat as quickly as direct contact with the rollers 207. In addition to the fluid cushions 401a, 401b, the first roller 209a and second roller 209b of the first pair of rollers 207 may continuously rotate along rotation directions 117a, 117b to provide a uniform temperature distribution and the capability to maintain the first and second rollers 209a, 209b at a desired operating temperature.

The ribbon 301 of molten material may then pass through the minimum width "W1" of the first gap "G1" of the first pair of rollers 107, 207 and fall to the second pair of rollers 111 underlying the first pair of rollers 107, 207. As shown, in some embodiments, the first gap "G1" and second gap "G2" may be aligned along a vertical plane in the draw direction 305 (e.g., direction of gravity). Thus, as shown, the ribbon 301 of molten material may travel in the draw direction 305 to the second gap "G2" of the second pair of rollers 111. The ribbon 301 of molten material may then pass through the minimum width "W2" of the second gap "G2" defined between the first roller 113a and the second roller 113b of the second pair of rollers 111. In some embodiments, the second gap "G2" have a minimum width "W2" (e.g., from 0.5 mm to 2.5 mm) that is less than the minimum width "W1" (e.g., from 1 mm to 5 mm) of the first gap "G1". Consequently, the thickness of the ribbon 301 of molten material may be reduced to the glass ribbon 103 with a thickness (e.g., from 0.5 mm to 2.5 mm) that may match the minimum width "W2" of the second gap "G2".

A second pool 115b of molten material may be formed upstream from the minimum width "W2" of the second gap "G2". The second pool 115a of molten material can comprise a reservoir of accumulated molten material positioned upstream from the minimum width "W2" of the second gap "G2" between the second pair of rollers 111 that can exist at a steady state where the mass flow rate of the ribbon 301 of molten material entering the second gap "G2" equals the mass flow rate of glass ribbon 103 exiting the second gap "G2".

The viscosity of the molten material within the second pool 115b of molten material can be from about 10,000 Poises to about 100,000 Poises. In another embodiment, the viscosity of the molten material within the second pool 115b of molten material can be from about 10,000 Poises to about 50,000 Poises. These viscosity ranges still permit pooling of molten material to allow consistent feeding of molten material through the minimum width "W2" of the second gap "G2".

As mentioned previously, the first roller 113a and/or the second roller 113b can include a textured outer surface 124. In such embodiments, the second pair of rollers 111 can impart at least one or both major surfaces of the glass ribbon 103 passing through the gap "G2" with a surface roughness. Furthermore, providing the second pool 115b of molten material ensures continuous stamping of the major surface (s) of the ribbon 301 of molten material to provide a consistent corresponding surface roughness corresponding to the textured outer surface 124. In some embodiments the surface roughness can be from 0.5 microns to 100 microns. Providing one or both major surfaces with a surface roughness (e.g., from 0.5 microns to 100 microns) can allow stacking of sheets separated from the glass ribbon 103 without undesired bonding between the sheets that might otherwise occur with smooth-surfaced glass sheets that are stacked together.

The manufacturing apparatus 101 and methods of manufacturing glass ribbon 103 discussed throughout the disclosure can allow for production of thin sheets of glass ribbon 103 produced from a glass composition that may be delivered at low viscosities and/or a glass composition that sets relatively slowly. For instance, some glass ceramic precursors used to make strengthened glass can exhibit low liquidus viscosities that benefit from the present apparatus and methods that accommodate molten material with relatively low viscosities. In some embodiments, each pair of rollers 107, 111 can catch molten material falling from above and form respective first and second pools 115a, 115b of molten material; thereby controlling the drawing process to generate a thin glass ribbon with a thickness from 0.5 mm to 2.5 mm, or from 0.5 mm to 2 mm, or from 0.5 mm to 1 mm although other thicknesses may be provided in further embodiments. In some embodiments, the first pair of rollers 107, 207 can pre-shape the flow of molten material and modify its average viscosity.

Furthermore, in some embodiments, the minimum width "W1" of the first gap "G1" of the first pair of rollers 107, 207 may be adjusted to change the thickness and/or temperature distribution of the ribbon 103 of molten material exiting the first gap "G1". Furthermore, adjustment of the minimum width "W1" of the first gap "G1" can be used to quickly compensate for some temperature of flow variation for the delivery system that can have a longer response time to correct. Still further, adjustment of the minimum width "W1" of the first gap "G1" and the rotational speed differential between the first pair of rollers 107 and second pair of rollers 207, it may be possible to adjust the width of the ribbon 301 and average viscosity of the molten material being introduced to the second pair of rollers 207. These adjustments can be useful to address a variety of conditions such as increased flow density, decreased viscosity at the delivery, and cases where glass viscosity increases slowly.

It should be understood that while various embodiments have been described in detail with respect to certain illustrative and specific examples thereof, the present disclosure should not be considered limited to such, as numerous modifications and combinations of the disclosed features are possible without departing from the scope of the following claims.

What it claimed is:

1. A method of manufacturing glass ribbon comprising:
feeding molten material through a minimum width of a first gap defined between a first roller and a second roller of a first pair of rollers, wherein a first pool of molten material is formed upstream from the minimum width of the first gap and the viscosity of the molten material within the first pool of molten material is from about 5 Poises to about 5,000 Poises, and wherein a ribbon of molten material exits the first gap;
producing a first fluid cushion positioned between the first roller of the first pair of rollers and the molten material passing through the first gap, wherein the first fluid cushion is produced by passing a fluid stream through each linear radial aperture of a first plurality of linear radial apertures extending through an outer wall of the first roller, each linear radial aperture of the first plurality of linear radial apertures comprising an unobstructed view of the molten material passing through the first gap, and the molten material does not contact the first roller of the first pair of rollers when passing through the first gap;
producing a second fluid cushion positioned between the second roller of the first pair of rollers and the molten material passing through the first gap, wherein the second fluid cushion is produced by passing a fluid stream through each linear radial aperture of a second plurality of linear radial apertures extending through an outer wall of the second roller, each linear radial aperture of the second plurality of linear radial apertures comprising an unobstructed view of the molten material passing through the first gap, and the molten material does not contact the second roller of the first pair of rollers when passing through the first gap; and
passing the ribbon of molten material through a minimum width of a second gap defined between a first roller and a second roller of a second pair of rollers, wherein the minimum width of the first gap is greater than the minimum width of the second gap, and wherein a second pool of molten material is formed upstream from the minimum width of the second gap and the viscosity of the molten material within the second pool of molten material is from about 10,000 Poises to about 100,000 Poises.

2. The method of claim 1, wherein the second pair of rollers imparts at least one major surface of the ribbon of molten material passing through the second gap with a surface roughness of from 0.5 microns to 100 microns.

3. The method of claim 1, wherein the minimum width of the first gap is within a range from 1 mm to 5 mm.

4. The method of claim 1, wherein the minimum width of the second gap is within a range from 0.5 mm to 2.5 mm.

5. The method of claim 1, further comprising adjusting the minimum width of the first gap while passing the molten material through the minimum width of the first gap.

6. The method of claim 1, wherein the first fluid cushion is produced by passing pressurized fluid through each linear radial aperture of the first plurality of linear radial apertures.

7. The method of claim 1, wherein the second fluid cushion is produced by passing pressurized fluid through each linear radial aperture of the second plurality of linear radial apertures.

8. A method of manufacturing glass ribbon comprising:
feeding molten material through a minimum width of a first gap defined between a first roller and a second roller of a first pair of rollers while adjusting the minimum width of the first gap, wherein a first pool of molten material is formed upstream from the minimum width of the first gap, and wherein a ribbon of molten material exits the first gap;
producing a first fluid cushion positioned between the first roller of the first pair of rollers and the molten material passing through the first gap, wherein the first fluid cushion is produced by passing a fluid stream through each linear radial aperture of a first plurality of linear radial apertures extending through an outer wall of the first roller, each linear radial aperture of the first plurality of linear radial apertures comprising an unobstructed view of the molten material passing through the first gap, and the molten material does not contact the first roller of the first pair of rollers when passing through the first gap;
producing a second fluid cushion positioned between the second roller of the first pair of rollers and the molten material passing through the first gap, wherein the second fluid cushion is produced by passing a fluid stream through each linear radial aperture of a second plurality of linear radial apertures extending through an outer wall of the second roller, each linear radial aperture of the second plurality of linear radial apertures comprising an unobstructed view of the molten material passing through the first gap, and the molten material does not contact the second roller of the first pair of rollers when passing through the first gap; and
passing the ribbon of molten material through a minimum width of a second gap defined between a first roller and a second roller of a second pair of rollers, wherein the minimum width of the first gap is greater than the minimum width of the second gap, and wherein a second pool of molten material is formed upstream from the minimum width of the second gap.

9. The method of claim 8, wherein the second pair of rollers imparts at least one major surface of the ribbon of molten material passing through the second gap with a surface roughness of from 0.5 microns to 100 microns.

10. The method of claim 8, wherein the adjusted minimum width of the first gap is within a range from 1 mm to 5 mm.

11. The method of claim 8, wherein the minimum width of the second gap is within a range from 0.5 mm to 2.5 mm.

12. The method of claim 8, wherein the first fluid cushion is produced by passing pressurized fluid through each linear radial aperture of the first plurality of linear radial apertures.

13. The method of claim 12, wherein the second fluid cushion is produced by passing pressurized fluid through each linear radial aperture of the second plurality of linear radial apertures.

14. A method of manufacturing glass ribbon comprising:
feeding molten material through a minimum width of a first gap defined between a first roller and a second roller of a first pair of rollers, wherein a first pool of molten material is formed upstream from the minimum width of the first gap, and wherein a ribbon of molten material exits the first gap;
producing a first fluid cushion positioned between the first roller of the first pair of rollers and the molten material passing through the first gap, wherein the first fluid cushion is produced by passing a fluid stream through each linear radial aperture of a first plurality of linear radial apertures extending through an outer wall of the first roller, each linear radial aperture of the first plurality of linear radial apertures comprising an unobstructed view of the molten material passing through the first gap, and the molten material does not contact the first roller of the first pair of rollers when passing through the first gap;
producing a second fluid cushion positioned between the second roller of the first pair of rollers and the molten material passing through the first gap, wherein the second fluid cushion is produced by passing a fluid stream through each linear radial aperture of a second plurality of linear radial apertures extending through an outer wall of the second roller, each linear radial aperture of the second plurality of linear radial apertures comprising an unobstructed view of the molten material passing through the first gap, and the molten material does not contact the second roller of the first pair of rollers when passing through the first gap; and
passing the ribbon of molten material through a minimum width of a second gap defined between a second pair of rollers, wherein the minimum width of the first gap is greater than the minimum width of the second gap, and wherein a second pool of molten material is formed upstream from the minimum width of the second gap.

15. The method of claim 14, wherein the second pair of rollers imparts at least one major surface of the ribbon of molten material passing through the second gap with a surface roughness of from 0.5 microns to 100 microns.

16. The method of claim 14, wherein the minimum width of the first gap is within a range from 1 mm to 5 mm.

17. The method of claim 14, wherein the minimum width of the second gap is within a range from 0.5 mm to 2.5 mm.

18. The method of claim 14, wherein the first fluid cushion is produced by passing pressurized fluid through each linear radial aperture of the first plurality of linear radial apertures.

19. The method of claim 18, wherein the second fluid cushion is produced by passing pressurized fluid through each linear radial aperture of the second plurality of linear radial apertures.

* * * * *